Figure 1:
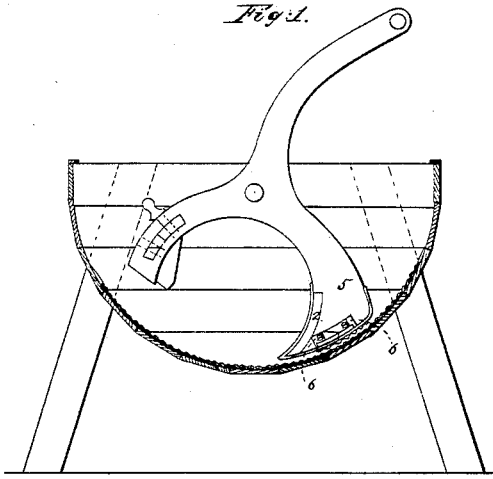
Figure 2:
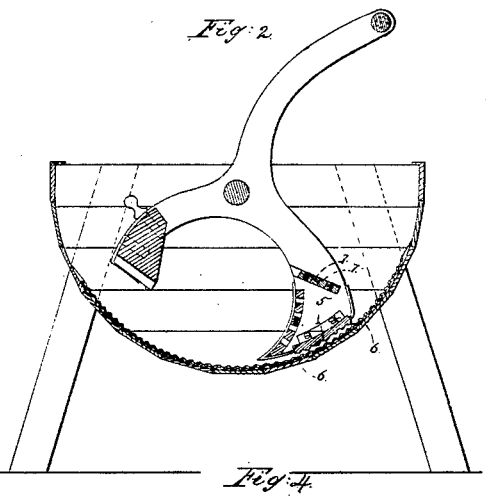
Figure 3:
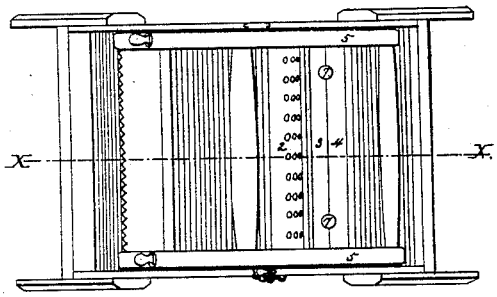
Figure 4:
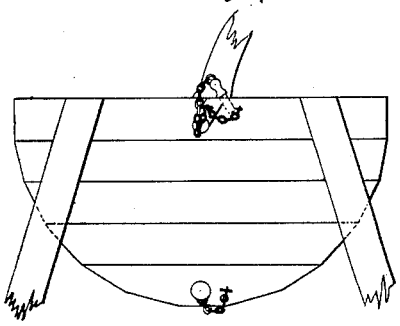

68. TEXTILES, FLUID TREATING APPARATUS.

NO PRINTED SPECIFICATION AVAILABLE

DRAFTSMAN.

36

C. Pendleton,

Washing Machine,

No. 281. A. I. May 29, 1860.

Witnesses;
John W. Campbell
Chas. H. Kenick

Inventor;
Charity Pendleton

N. PETERS, PHOTO-LITHOGRAPHER, WASHINGTON, D. C.